United States Patent [19]

Heilman et al.

[11] Patent Number: 5,367,909
[45] Date of Patent: Nov. 29, 1994

[54] TEST WEIGHT

[75] Inventors: Raymond D. Heilman, St. Louis, Mo.; Butch LaRue, Madison, Ill.

[73] Assignee: Emerson Electric Co., St. Louis, Mo.

[21] Appl. No.: 1,587

[22] Filed: Jan. 7, 1993

[51] Int. Cl.$^5$ ............................................. G01M 1/16
[52] U.S. Cl. ...................................... 73/468; 73/462; 74/573 R; 180/381; 301/5.21; 310/51
[58] Field of Search ............... 73/468, 487, 462, 460, 73/471, 475, 476, 477, 672; 74/573 R; 180/381; 301/5 B, 41 W; 310/51, 81

[56] References Cited

U.S. PATENT DOCUMENTS

| | | | |
|---|---|---|---|
| 3,953,074 | 4/1976 | Cox | 74/573 R |
| 4,400,037 | 8/1983 | Gentry | 74/573 R |
| 4,893,044 | 1/1990 | Bush et al. | 74/573 R |
| 5,116,106 | 5/1992 | Hardesty et al. | 74/573 R |

*Primary Examiner*—Hezron E. Williams
*Assistant Examiner*—Helen C. Kwok

*Attorney, Agent, or Firm*—Polster, Lieder, Woodruff & Lucchesi

[57] ABSTRACT

A test weight for use with a counterbalanced motor for a compressor assembly, for example, including a body having an opening formed in it and sized to engage the outer diameter of an external eccentrically positioned ball bearing of the counterbalanced motor. A plurality of cantilevered spring fingers are integrally formed with the body along the opening in the test weight for spring gripping the external ball bearing. A plurality of centering pads formed on the fingers hold the center of mass of the test weight close to the center of mass of the ball bearing. In the preferred embodiment, stop tabs project from the centering pads to provide a positive stop upon contact with the outer race of the ball bearing. A method of testing a motor employs the test weight which is attached to the ball bearing to reproduce the application load requirements for the motor, and permits testing of the motor independently of the application.

12 Claims, 2 Drawing Sheets

TEST WEIGHT

BACKGROUND OF THE INVENTION

The present invention relates to dynamoelectric machine testing, and in particular to testing methods for motors used in compressors. The invention provides a test weight for determining whether a counterbalanced motor for use in a compressor assembly, for example, will offset the weight of customer or application components within the assembly in actual use. While the invention is described in particular detail with respect to its use in air compression motor applications, those skilled in the art will recognize the wider applicability of the invention disclosed hereinafter.

A counterbalanced motor is attached to a customer application (such as a compressor assembly and produces the energy required to perform a certain function. When a counterbalanced motor fails to offset the attached component, excessive vibration and vibrational noise occurs within the customer application. A correctly balanced motor minimizes this problem.

Commonly, motors for many applications are manufactured by independent motor manufacturers, and latter attached or inserted in the intended application. For example, counterbalanced motors for use in air compressors are assembled independently from the product for which they are intended. These motors are latter connected to or with customer applications at the application manufacturer location. A motor manufacturer has difficulty determining whether the counterbalanced motor will offset the application components, which are secured to the motor, adequately to minimize vibration and noise without actually building the motor into the application or attaching the application component to the motor. Several attempts have been made to counterbalance an application component properly with a counterbalanced motor. One method is to build the motor and the component together and actually test the balance. If the motor fails to counterbalance the component properly, the unit is disassembled, modified and then reassembled. Repetition of this process may occur several times until the weight of the counterbalanced motor reaches the critical amount required to sufficiently offset the application component. This method of testing balance by actual assembly of an application component unit is costly and time consuming. In the alternative, the motor is tested for electrical performance, without test of the counterbalance requirement. While the test procedure is relatively low cost, the operation of the final product maybe unacceptable.

SUMMARY OF THE INVENTION

It is therefore an object of this invention to provide an apparatus and method for determining whether or not a counterbalanced motor offsets an application component without having actually to attach the counterbalanced motor to the application component.

Another object of this invention is to provide a simple method of determining whether or not a counterbalanced motor offsets an application component.

Yet another object of this invention is to provide an inexpensive apparatus and method for determining whether or not a counterbalanced motor properly balances an application component.

Still another object of this invention is to provide a method for determining whether or not a counterbalanced motor offsets an application component that is not time consuming, is easy to accomplish in connection with any associated electrical test, and is low cost.

Other objects will become apparent to those skilled in the art in light of the following description and accompanying drawings.

In accordance with this invention, generally stated, a test weight is provided for use with a counterbalanced motor having a rotor, a stator, and an external eccentric member rotating within an application, the motor and external eccentric member later attaching to customer application components, the test weight being used to determine whether the weight of the counterbalanced motor offsets the weight of an application component.

The test weight includes a body having an opening sized to engage the outer diameter of the external eccentric member. The eccentric member is mounted on the rotor shaft of the counterbalanced motor. The test weight includes a plurality of cantilevered spring fingers adjacent the opening of the test weight which grip the eccentric member during test. Details of the test weight are described in co-pending application S.N. 08/001,322, filed Jan. 25, 1993, assigned to the assignee of the present invention and incorporated herein by reference. In the preferred embodiment, the eccentric member includes a ball bearing. The fingers have a plurality of centering pads adapted to hold the center of mass of the test weight in proximity with the center of mass of the bearing. Preferably, the test weight also includes a plurality of stop tabs projecting from the centering pads, which act to provide a positive stop in conjunction with the outer race of the ball bearing through abutment of the tabs and race.

The test weight duplicates the inertial load of the application component and gives a simple, lost method of determining whether or not the counterbalanced motor is properly balanced for subsequent attachment with the application component. The method includes mounting the test weight on the ball bearing of the counterbalanced motor and observing whether or not the test weight adequately balances the motor. By duplicating the inertial load of the customer application, the test weight permits gauging the balance without actually joining the motor to the component.

DESCRIPTION OF A PREFERRED EMBODIMENT

Figure 5:
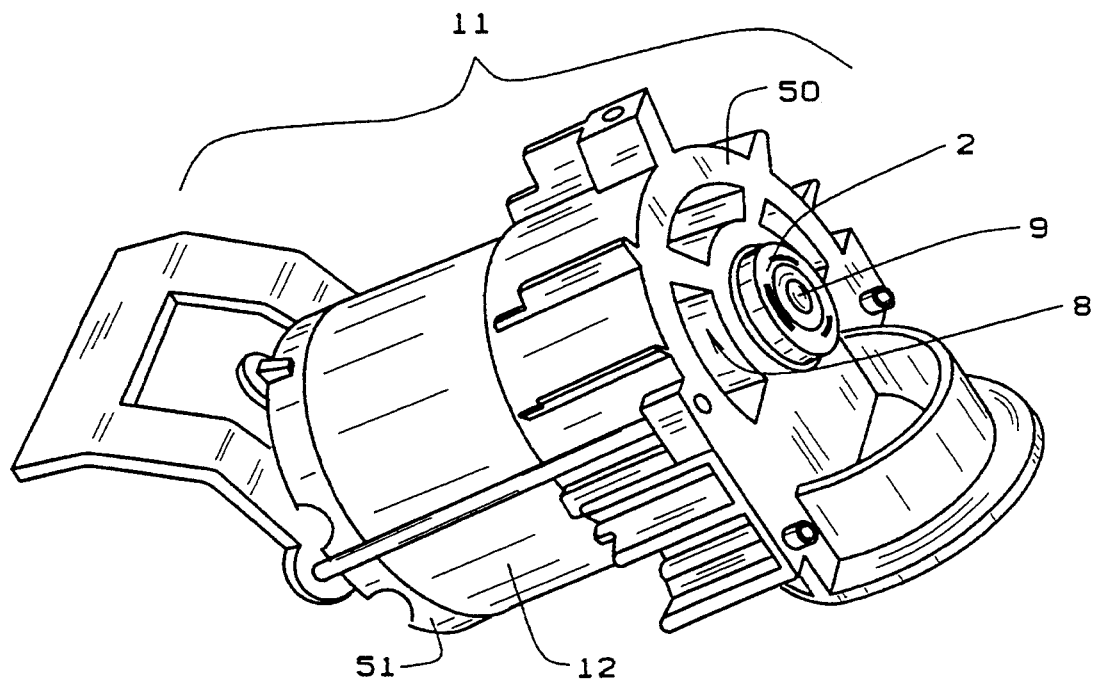
FIG. 5 is a view in perspective of a test weight attached to a counterbalanced motor prior to mounting in a predetermined application; and, FIG. 6 is a view in perspective of a customer application attached to a counterbalanced motor.

Referring now to the drawings for one illustrative embodiment of test weight of the present invention, reference numeral 1 indicates one illustrative embodiment of the test weight ready for attachment to a motor 11, best seen in FIG. 5.

Figure 1:
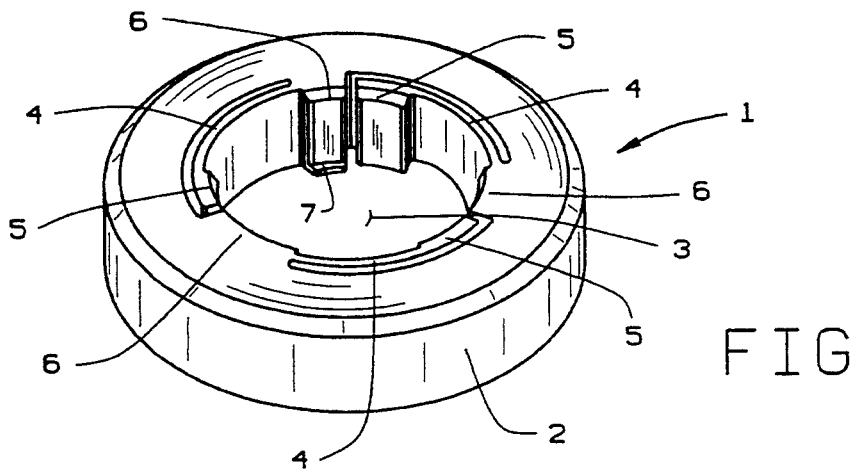
FIG. 1 is a view in perspective of a test weight for a counterbalanced motor.
Figure 2:
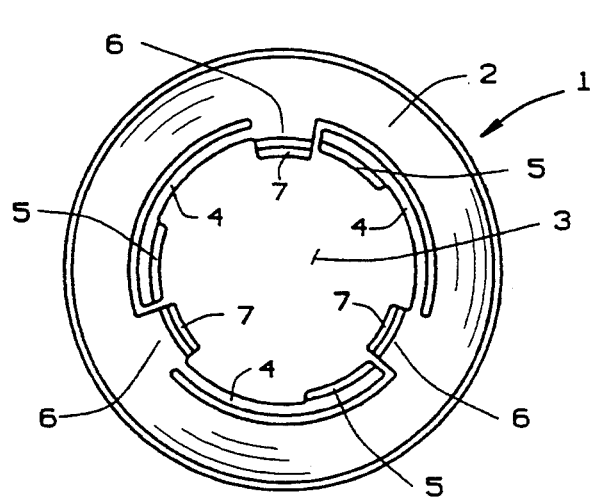
FIG. 2 is a top plan view thereof.
Figure 3:
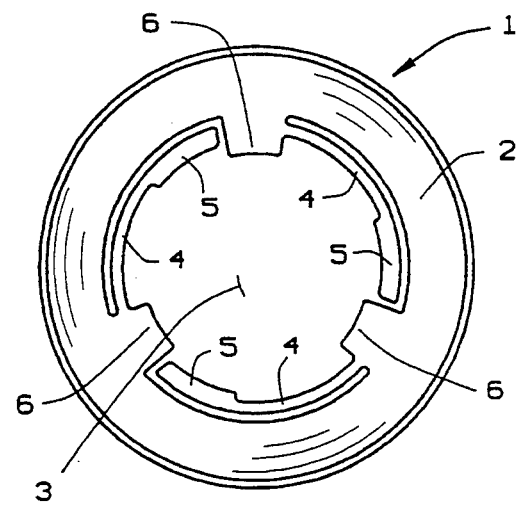
FIG. 3 is a bottom plan view thereof.
Figure 4:
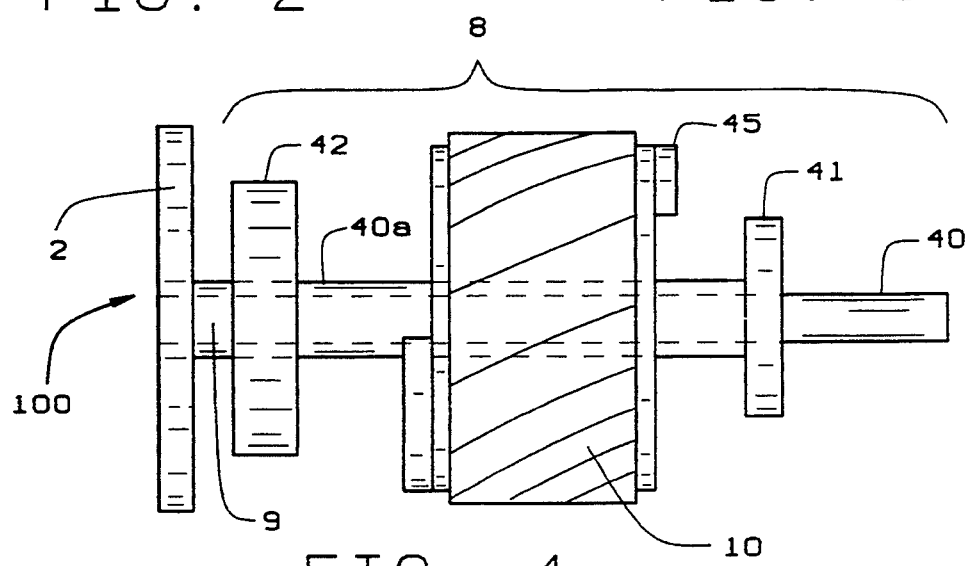
FIG. 4 is a diagrammatic view in side elevation of a test weight attached to counterbalanced motor parts.

The test weight 1 shown in FIG. 1, includes a body 2 having an opening 3 formed in it. The opening 3 is sized to engage the outer diameter of an externally positioned eccentric member, preferably in the form of a ball bearing 9 of a counterbalanced motor system 100, best seen in FIG. 4. As shown in FIG. 4, the counterbalanced motor system 100 includes a shaft 40 having a first bearing and a second bearing 41 and 42, respectively supporting the shaft for rotation. A rotor assembly 10 is mounted to the shaft 40. Rotor assembly 10 has a plurality of counter weights 45 mounted to it. The counter weights 45 are intended to counter balance applicational forces acting on the eccentric member bearing 9 in applicational use. The external eccentric member bearing 9 is mounted on a shaft extension 40a.

The body 2 includes a plurality of cantilevered spring fingers 4 integrally formed adjacent the inner diameter of body 2. Cantilevered spring fingers 4 each include a contact pad 5 to secure test weight 1 to eccentric member ball bearing 9. As previously indicated, test weight 1 is secured into place by the fingers 4 which spring grip bearing 9. The inner diameter of body 2 also includes a plurality of centering pads 6 which allow test weight 1 to slip fit on the outer diameter of the eccentric member ball bearing 9. Centering pads 6 hold the center of mass of test weight 1 in proximity with the center of mass of eccentric member ball bearing 9. These centering pads 6 ensure proper placement of test weight 1 on eccentric member ball bearing 9 when the forces produced by the spring grip of cantilevered spring fingers 4 are unequal. In addition, centering pads 6 preferably each have a stop tab 7 formed on the axially outboard side of the pads. The stop tabs 7 prevent test weight 1 from moving to an inaccurate position on eccentric member ball bearing 9 during test procedures. Stop tabs 7 provide a positive stop against the outer race of eccentric member ball bearing 9.

Figure 6:
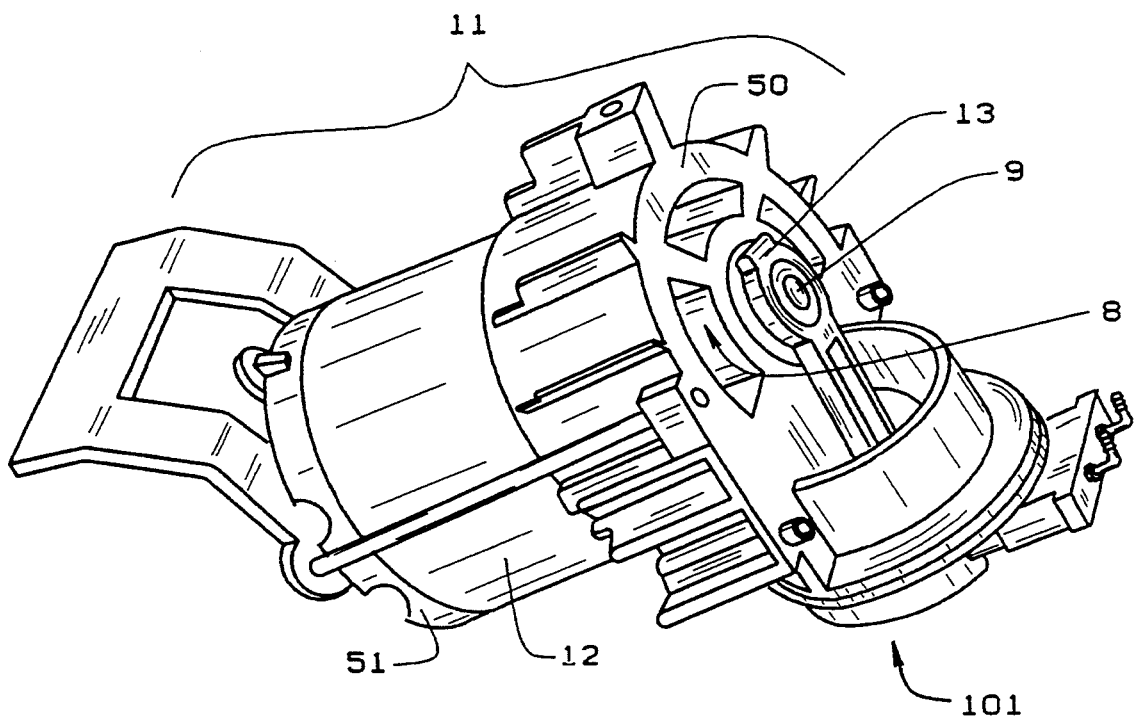

Referring now to FIGS. 4–6, as indicated, counterbalanced motor system 8 includes the rotor assembly 10, while the motor 11 includes a stator assembly (not shown) within a housing or shell 12 of the motor 11. A pair of end shields 50 and 51 house the bearings 41 and 42 and support the shaft 40 for rotation. In the embodiment illustrated, the end shields 50 and 51 are designed with respect to the intended eventual use of motor 11, for example, a compressor application in final assembly. The eccentric ball bearing 9 extends from one end of the end shield 50. The motor 11 then is tested as shown in FIG. 5, the test weight 1 being used to simulate applicational use. Test weight 1 reproduces the inertial load of a application component 13, best observed in FIG. 6.

As indicated above, the test weight 1 is intended as a replacement for the application component 13. After manufacture, motor 11 testing is accomplished by duplicating the load of component 13 with test weight 1 to determine proper application operation before the motor 11 is shipped to an application and before the customer markets the motor 11 in its intended application. When motor 11 is properly balanced, vibration and vibrational noises are minimized. Test weight 1 determines whether motor 11 will offset application component 13 before the component 13 is actually attached to the motor and built into compressor assembly 101, for example.

Numerous variations, within the scope of the appended claims, will be apparent to those skilled in the art in light of the preceding description and accompanying drawings. Merely by way of example, the design configuration of the test weight may vary in other embodiments of our invention. Likewise, the number of fingers used with a particular test weight may change. The kind, shape or position of the eccentric member may vary. Also, the design configuration of the motor 11 may be altered, depending on the intended application of the motor. These variations are merely illustrative.

We claim:

1. A test weight for use with a counterbalanced motor having a rotor, a stator and an eccentric ball bearing having an outer diameter, said test weight for determining whether the weight of said counterbalanced motor offsets an application component before attaching said motor to said application component, the test weight comprising: a body having an opening sized to engage the outer diameter of said eccentric ball bearing of the counterbalanced motor, a plurality of cantilevered spring fingers integral with the body and adjacent to the opening of said test weight for spring gripping said eccentric ball bearing and securing the test weight thereto, a plurality of centering pads for holding the center of mass of said test weight in proximity with the center of mass of said eccentric ball bearing, and a plurality of stop tabs projecting from said centering pads for providing a positive stop against an outer race of said eccentric ball bearing for accurate axial location of said test weight.

2. The test weight of claim 1 wherein said cantilevered spring fingers include a contact pad for securing said test weight to said eccentric ball bearing.

3. The test weight of claim 1 wherein said test weight is mounted on the eccentric ball bearing of said counterbalanced motor at the application component attachment site.

4. The test weight of claim 1 wherein said test weight reproduces the inertial load of an application component of the compressor.

5. The test weight of claim 1 wherein said test weight offsets the counterbalanced motor when said counterbalanced motor is properly weighted.

6. A method of determining whether a counterbalanced motor offsets the weight of an application component wherein said counterbalanced motor includes a rotor, a stator, and an eccentric; said method comprising the steps of:
   a) securing a test weight to said eccentric wherein said test weight includes a body, said body having an opening sized to embrace said eccentric, a plurality of cantilevered spring fingers attached to said test weight along the opening of said test weight for spring gripping said eccentric, a plurality of centering pads for holding the center of mass of said test weight in proximity with the center of mass of said eccentric, and a plurality of stop tabs downwardly projecting from said centering pads, said pads providing a positive stop against the outer race of said eccentric for accurate axial location; and
   b) operating the counterbalanced motor with said test weight secured on said eccentric and observing whether or not the test weight counterbalances the counterbalanced motor.

7. The method of claim 6 wherein said test weight duplicates the inertial load of components which make up said application component.

8. In a motor including a stator assembly and a rotor assembly supported for rotation with respect to the stator assembly, said rotor assembly including a shaft, said shaft having an eccentric mounted externally of said stator assembly, said eccentric connected to an application component, said rotor assembly being counterbalanced to offset the effect of said eccentric and said application component, the improvement comprising: testing means for determining whether the weight of said counterbalanced motor offsets an application component before said application component is attached to said counterbalanced motor, said testing means comprising a weight including a body having an opening therethrough, said opening being sized to engage said eccentric, said weight including a plurality of fingers attached to said body and adapted to grip said eccentric for securing the test weight thereto, and a plurality of centering pads attached to said fingers for holding the center of mass of said test weight in proximity to the center of mass of said eccentric.

9. The test weight of claim 8 wherein said fingers are cantilevered radially inwardly from said body along the opening therethrough.

10. The improvement of claim 9 wherein said centering pads have a plurality of stop tabs projecting outwardly, and integrally formed with said pads, said stop tabs providing a positive stop against said eccentric.

11. The improvement of claim 10 wherein said test weight is the equivalent of the inertial load of the application component to which the eccentric is attached in applicational use.

12. The improvement of claim 11 wherein said test weight offsets the counterbalanced rotor when said counterbalanced rotor is properly weighted.

* * * * *